US010235885B2

(12) United States Patent
An et al.

(10) Patent No.: US 10,235,885 B2
(45) Date of Patent: Mar. 19, 2019

(54) AUTONOMOUS VEHICLE DRIVING SYSTEM AND METHOD

(71) Applicant: Electronics and Telecommunications Research Institute, Daejeon (KR)

(72) Inventors: Kyoung Hwan An, Daejeon (KR); Woo Yong Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 260 days.

(21) Appl. No.: 15/405,956

(22) Filed: Jan. 13, 2017

(65) Prior Publication Data

US 2017/0221366 A1 Aug. 3, 2017

(30) Foreign Application Priority Data

Jan. 29, 2016 (KR) ........................ 10-2016-0011326

(51) Int. Cl.
*G08G 1/16* (2006.01)
*G08G 1/07* (2006.01)
*G05D 1/00* (2006.01)

(52) U.S. Cl.
CPC ........... *G08G 1/166* (2013.01); *G05D 1/0088* (2013.01); *G08G 1/07* (2013.01)

(58) Field of Classification Search
CPC . B29C 66/71; B29C 65/1635; B29C 65/1658; B29C 66/1122; B29C 66/43; B29C 66/723; B29C 66/73921
See application file for complete search history.

(56) References Cited

U.S. PATENT DOCUMENTS 9,707,960 B2 * 7/2017 Gutmann .............. B60W 30/09
2013/0018572 A1 1/2013 Jang
2013/0211656 A1 8/2013 An et al.
2013/0253754 A1 9/2013 Ferguson et al.
2013/0325241 A1 12/2013 Lombrozo et al.
2014/0267734 A1 * 9/2014 Hart, Jr. .................... G08G 1/07 348/149
2014/0303829 A1 10/2014 Lombrozo et al.
2015/0187216 A1 * 7/2015 Kwak .............. G08G 1/096725 701/24
2015/0360692 A1 12/2015 Ferguson et al.
(Continued)

FOREIGN PATENT DOCUMENTS

JP 2011060019 A 3/2011
KR 1020130007754 A 1/2013
(Continued)

*Primary Examiner* — Redhwan K Mawari
(74) *Attorney, Agent, or Firm* — William Park & Associates Ltd.

(57) ABSTRACT

Disclosed are an autonomous vehicle driving system and method that increase probability that a signal of a traffic light will be recognized by using map information built in an autonomous vehicle driving system and a traffic light infrastructure, determine which travel route is allowed according to a camera recognition result and signal information delivered through V2X communication (traveling is allowed from which entrance lane to which exit lane), and enable an autonomous driving vehicle and a traffic light infrastructure to exchange intersection passage route information in order to allow the autonomous driving vehicle to efficiently pass through an intersection.

18 Claims, 11 Drawing Sheets

(56) References Cited

U.S. PATENT DOCUMENTS

| | | | |
|---|---|---|---|
| 2016/0209844 | A1 | 7/2016 | Lombrozo et al. |
| 2017/0355375 | A1 | 12/2017 | Ferguson et al. |

FOREIGN PATENT DOCUMENTS

| | | | |
|---|---|---|---|
| KR | 1020130085235 | A | 7/2013 |
| KR | 1020130091907 | A | 8/2013 |
| KR | 1020140011247 | A | 1/2014 |
| KR | 1020140038180 | A | 3/2014 |
| KR | 1020140130521 | A | 11/2014 |
| KR | 1020150016381 | A | 2/2015 |
| KR | 1020150075774 | A | 7/2015 |

* cited by examiner

AUTONOMOUS VEHICLE DRIVING SYSTEM AND METHOD

CROSS-REFERENCE TO RELATED APPLICATION

This application claims priority to and the benefit of Korean Patent Application No. 10-2016-0011326, filed on Jan. 29, 2016, the disclosure of which is incorporated herein by reference in its entirety.

BACKGROUND

1. Field of the Invention

The present invention relates to an autonomous vehicle driving system and method, and more particularly, to an autonomous vehicle driving system and method that facilitate determination of a travelable route according to a signal of a traffic light at an intersection or crosswalk and thus increase traffic efficiency.

2. Discussion of Related Art

Conventional autonomous driving systems recognize traffic lights mainly by using cameras to determine whether to travel and pass through intersections or crosswalks.

However, even though a camera with excellent recognition performance is used to recognize signals of traffic lights, signals of traffic lights cannot be recognized or another traffic light may be misrecognized depending on a location of a vehicle equipped with a camera or when the traffic lights are hidden by other vehicles.

As another method, traffic lights may be recognized by sending signal information to ambient vehicles through vehicle-to-everything (V2X) communication devices installed in the traffic lights. However, an autonomous driving system cannot be aware of information regarding from which lane to which lane a vehicle may travel just by sending the signal information (this is true also for information regarding a traffic light recognized by a camera). Also, the method cannot be used at a crosswalk or an intersection where signal information from a V2X communication device is not provided.

In addition to the above problems, the convention methods have problems in that a signal is controlled with only signal timing or vehicle recognition, or signal information is unilaterally broadcast, even though an autonomous system can increase traffic efficiency through bi-directional communication with an infrastructure of a traffic light.

SUMMARY OF THE INVENTION

The present invention is directed to providing an autonomous vehicle driving system and method that facilitate determination of a travelable route at an intersection or crosswalk according to a signal of a traffic light by using a road map, a camera, and a vehicle-to-everything (V2X) communication device and thus increase traffic efficiency.

That is, the present invention is directed to providing an autonomous vehicle driving system and method that increase probability that a signal of a traffic light will be recognized by using map information built in an autonomous vehicle driving system and a traffic light infrastructure, determine which travel route is allowed according to a camera recognition result and signal information delivered through V2X communication (traveling is allowed from which entrance lane to which exit lane), enable an autonomous driving vehicle and a traffic light infrastructure to exchange intersection passage route information in order to allow the autonomous driving vehicle to efficiently pass through the intersection.

According to an aspect of the present invention, there is provided an autonomous vehicle driving system including an autonomous driving device installed in a vehicle and configured, when there is a traffic light in front while the vehicle is traveling autonomously, to receive traffic light signal information and map information regarding a travel location over a network, map the received map information to prestored map information, and perform autonomous driving along a predetermined route when the received traffic light signal information corresponding to its own travel route information is a traveling allowed signal; and a server configured to transmit the map information regarding the travel location and the traffic light signal information to the autonomous driving device over the network, receive information regarding a passage route at an intersection or a crosswalk where the traffic light is located from the autonomous driving device, analyze possibility of autonomous driving vehicles colliding according to the received passage route information, and control a signal of the traffic light at the intersection or crosswalk according to a result of the analysis.

When the traffic light signal information is not received from the server, the autonomous driving device may determine whether the signal of the traffic light is a traveling allowed signal by using a camera installed in the vehicle.

The autonomous driving device and the server may transmit or receive data through vehicle-to-everything (V2X) communication.

The server may receive information regarding travel routes from autonomous driving devices installed in a plurality of autonomous driving vehicles, recognize vehicles near the intersection or crosswalk where the traffic light is located according to the received travel route information of the autonomous driving devices, compare the number of travel routes with the number of recognized vehicles, and determine whether all of the vehicles traveling at the crosswalk or intersection are autonomous driving vehicles.

When all of the vehicles traveling at the crosswalk or intersection are autonomous driving vehicles, the server may determine whether the travel routes of the autonomous driving vehicles will lead to collisions with each other and control the signal of the traffic light according to a result of the determination.

The autonomous driving device may include a driving environment recognition unit configured to recognize an obstacle and a travelable area of the route while the vehicle is traveling autonomously and create obstacle recognition information and travelable area information; a traffic light signal recognition unit configured to recognize a signal state of the traffic light from a forward-direction image of the travel route; a receiver configured to receive traffic light signal information of the intersection or crosswalk where the traffic light is located and information regarding a map of surroundings of the intersection or crosswalk from the server through V2X communication; a transmitter configured to transmit the travel route information to the server through V2X communication according to the map information corresponding to its own location information; a traffic light signal determination unit configured to determine a current state of the traffic light according to the traffic light signal information received through the receiver or the traffic light signal state information recognized by the traffic light signal recognition unit; a map merging unit configured to merge the map information, driving environment information, and the information regarding a map of surroundings of the intersection or crosswalk received from the server through the receiver to create a map of the travel route; and a driving situation determination and route planning unit configured to determine a driving situation according to the map mapped by the map merging unit, the location information, and the traffic light signal state determined by the traffic light signal determination unit, plan a local route according to the driving situation, and generate a control signal for controlling autonomous driving of the vehicle.

The autonomous driving device may further include a global route planning unit configured to calculate a global route from an origin to a destination that is set by a user using the map information and provide information regarding the calculated global route to the transmitter; a location recognition unit configured to acquire global location information using the map information and a location of the vehicle obtained through GPS and provide the acquired global location information to the driving situation determination and route planning unit; and a driving environment recognition unit configured to recognize the obstacle and the travelable area on the travel route and provide the driving environment information including obstacle recognition information and travelable area information to the map merging unit.

The driving environment information including the obstacle recognition information and the travelable area information may be recognized using information obtained with a camera, a radar, and a LiDAR installed in the vehicle.

The server may include an image acquisition unit configured to acquire an image of vehicles traveling near the intersection or crosswalk where the traffic light is located; a traffic light controller configured to control a signal state of the traffic light of the intersection or crosswalk according to a provided control signal and create signal state information of the traffic light; an intersection passage route transceiver configured to receive intersection passage route information from the autonomous driving device through V2X communication and transmit the received intersection passage route information to an autonomous driving device of a nearby vehicle through V2X communication; a map-linked signal information providing unit configured to create lamp-specific signal information and maneuvering allowed section information using the traffic light signal state information and nearby-road map information created by the traffic light controller; an intersection map providing unit configured to broadcast the traffic light signal state information and an intersection road network structure to autonomous driving devices through V2X communication using the nearby-road map information; and an intersection passage coordinator configured to analyze the number of vehicles traveling near the intersection using the acquired image, analyze possibility of collision between the autonomous driving vehicles using the intersection passage route information received through the intersection passage route transceiver, and provide a control signal for controlling the signal of the traffic light at the intersection or crosswalk to the traffic light controller according to a result of the analysis.

The intersection passage coordinator may determine whether all of the vehicles passing through the intersection are autonomous driving vehicles by using the number of vehicles traveling near the intersection obtained through the acquired image and the number of pieces of the intersection passage route information received through the intersection passage route transceiver, determine whether the autonomous driving vehicles will collide with each other at the intersection when all of the vehicles are autonomous driving vehicles, and provide the control signal to the traffic light controller according to a result of the determination.

The intersection passage coordinator may determine that all of the vehicles passing through the intersection are autonomous driving vehicles when the number of vehicles traveling near the intersection is equal to the number of pieces of the intersection passage route information received through the intersection passage route transceiver and control the control signal to the traffic light controller when the routes of the vehicles passing through the intersection will not lead to collisions with each other.

According to another aspect of the present invention, there is provided an autonomous vehicle driving method including, by an autonomous driving device installed in a vehicle, receiving traffic light signal information and map information regarding a travel location over a network when there is a traffic light in front while the vehicle is traveling autonomously, mapping the received map information to prestored map information, and performing autonomous driving along a predetermined route when the received traffic light signal information, which corresponds to its own travel route information, is a traveling allowed signal; and, by a server, transmitting the map information regarding the travel location and the traffic light signal information to the autonomous driving device over the network, receiving information regarding a passage route at an intersection or a crosswalk where the traffic light is located from the autonomous driving vehicle, analyzing possibility of collision between autonomous driving vehicles according to the received passage route information, and controlling a signal of the traffic light at the intersection or crosswalk according to a result of the analysis.

The autonomous driving device and the server may transmit or receive data through V2X communication.

The performing of autonomous driving may include mapping a map of surroundings of the intersection or crosswalk where the traffic light is located that is received from the server through V2X communication with a map of a planned route when there is a traffic light in front of the vehicle while the vehicle travels in an autonomous driving mode; transmitting intersection passage route information to the server through V2X communication when traffic light signal state information is received from the server through V2X communication; performing autonomous driving along a predetermined route when the received traffic light state information is a signal for allowing the vehicle to travel in an intended direction.

The performing of autonomous driving may include, when the traffic light signal state information is not received from the server through V2X communication, recognizing a signal state of the traffic light in front of the vehicle through a camera installed in the vehicle and determining whether to allow the travel.

The controlling of a signal of the traffic light may include broadcasting the map-linked signal information and the map information regarding the surroundings of the intersection to an autonomous driving device of a vehicle traveling near the intersection through a V2X modem when signal manipulation mode of the traffic light at the intersection or crosswalk is an automatic manipulation mode; receiving information regarding intersection passage routes from autonomous driving devices of vehicles near the intersection through V2X communication; recognizing the vehicles traveling near the intersection; and analyzing whether the routes of the recognized autonomous driving vehicles will lead to collisions with each other and controlling a signal state of the traffic light at the intersection according to a result of the analysis.

The traveling vehicles may be recognized using an image acquired through a camera.

The controlling of a signal state of the traffic light may include comparing the number of recognized traveling vehicles and the number of pieces of the intersection passage route information received through V2X communication; determining that all of the traveling vehicles are autonomous driving vehicles, analyzing the intersection passage route information received from the autonomous driving devices of the vehicles, and determining whether the autonomous driving vehicles are likely to collide with each other when the number of traveling vehicles is equal to the number of pieces of the received intersection passage route information; and controlling the signal of the traffic light at the intersection when it is determined that the autonomous driving vehicles are not likely to collide with each other.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Advantages and features of the present invention, and implementation methods thereof will be clarified through following embodiments described with reference to the accompanying drawings. The present invention may, however, be embodied in different forms and should not be construed as being limited to the embodiments set forth herein. Rather, these embodiments are provided so that this disclosure will be thorough and complete and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" or "comprising," when used in this specification, specify the presence of stated features, integers, steps, operations, elements, and/or components but do not preclude the presence or addition of one or more other features, integers, steps, operations, elements, components, and/or groups thereof.

Before an autonomous vehicle driving system and method according to an embodiment of the present invention are described, problems of the related art will be described in detail first. Then, an autonomous vehicle driving system and method according to an embodiment of the present invention that are intended to solve the problems will be described in detail later.

Figure 1:
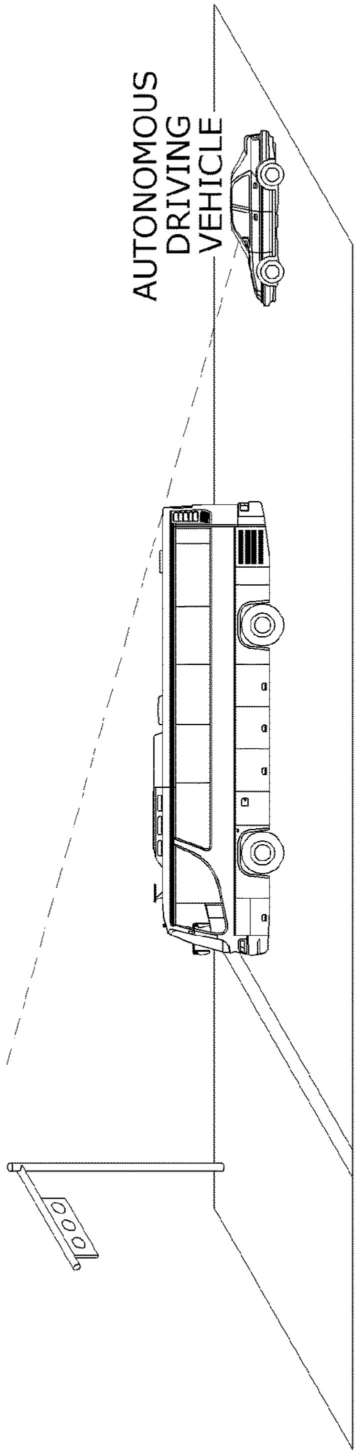
FIG. 1 is a diagram for describing an example in which an autonomous driving vehicle cannot recognize a signal of a traffic light when the traffic light is hidden by an obstacle in front of or other vehicles near the autonomous driving vehicle.

FIG. 1 is a diagram for describing an example in which an autonomous driving vehicle cannot recognize a signal of a traffic light when the traffic light is hidden by an obstacle in front of or other vehicles near the autonomous driving vehicle.

As shown in FIG. 1, since the autonomous driving vehicle cannot move until a preceding vehicle starts moving and thus a traffic light ahead is visible, the autonomous driving vehicle cannot be aware of a state of the traffic light.

Figure 2:
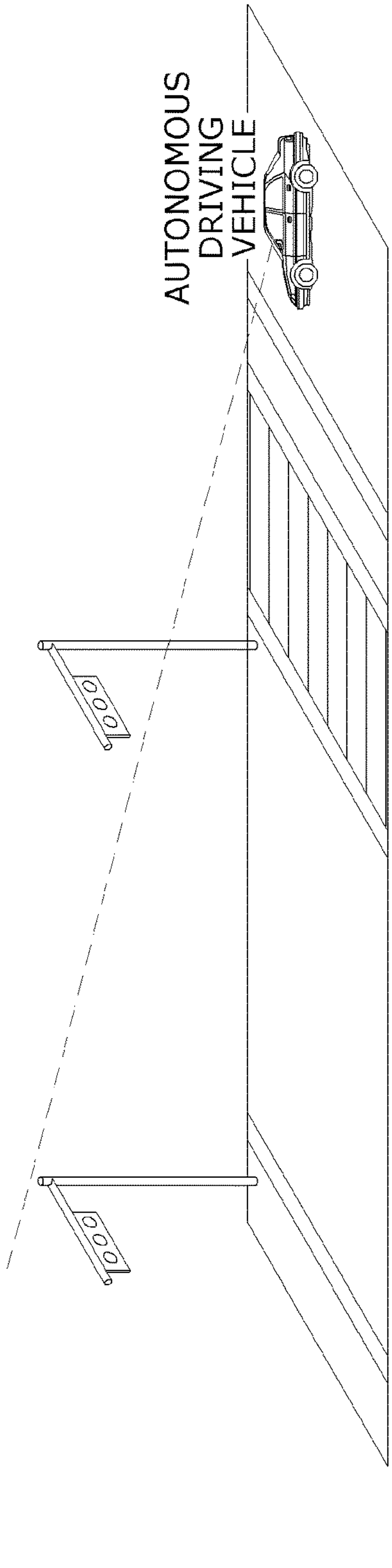
FIG. 2 is a diagram for describing an example in which an autonomous driving vehicle cannot recognize a signal of a traffic light or may misrecognize a nearby traffic light depending on a location of the autonomous driving vehicle.

FIG. 2, which is a diagram for describing an example in which an autonomous driving vehicle cannot recognize a signal of a traffic light or may misrecognize a nearby traffic light depending on a location of the autonomous driving vehicle, shows an example in which an autonomous driving vehicle cannot recognize a corresponding traffic light or may misrecognize a nearby traffic light depending on a location at which the autonomous driving vehicle is stopped, even though the corresponding traffic light is not hidden by a front obstacle or a nearby vehicle.

As shown in FIG. 2, signal information of the nearest traffic light recognized by a camera installed in the autonomous driving vehicle may not be a signal corresponding to a location at which the autonomous driving vehicle is stopped.

Since the camera has a limited field of view (FOV) according to installation location, traffic lights installed at various locations on a road may not be recognized.

Figure 3A:
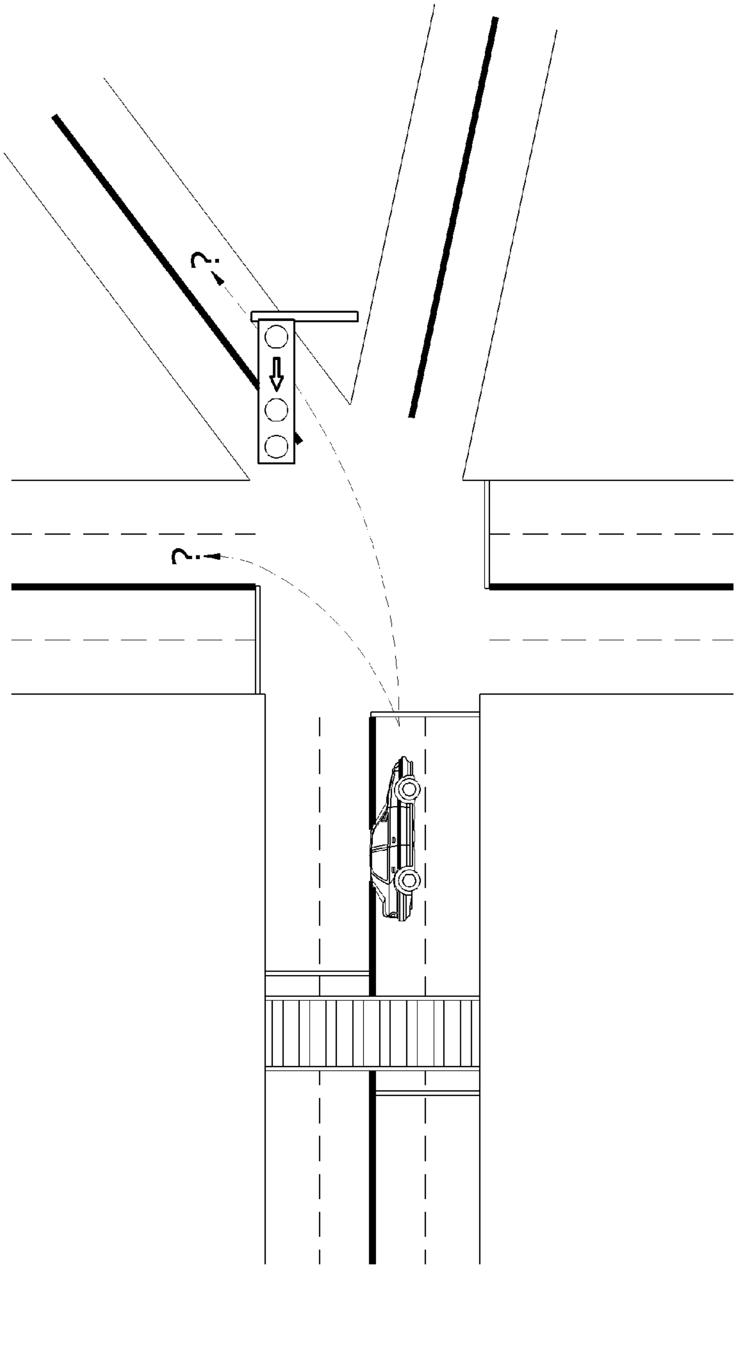
FIG. 3A and FIG. 3B is a diagram for describing problems caused when only a signal of a traffic light is recognized by a camera or received through vehicle-to-everything (V2X) communication.
Figure 3B:
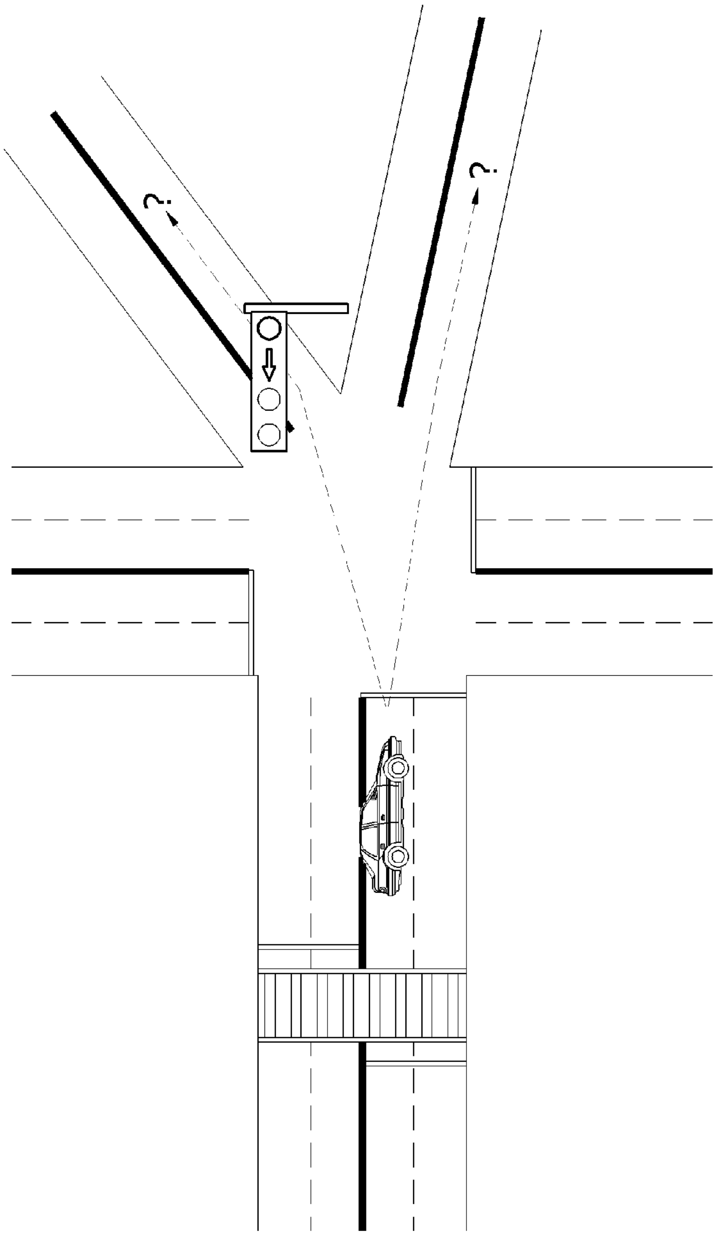

FIGS. 3A and 3B are diagrams for describing problems caused when only a signal of a traffic light is recognized by a camera or received through vehicle-to-everything (V2X) communication.

As shown in FIGS. 3A and 3B, the first problem when only a signal of a traffic light is recognized is that it is difficult to be aware of whether the signal of the traffic light is associated with a current location of an autonomous driving vehicle. The nearest traffic light may not be a traffic light that needs to be recognized by a current vehicle because locations of traffic lights are varied depending on location.

The second problem is that it is difficult to be aware of on which lane and which road travel is allowed by green light of the traffic light, even when the autonomous driving vehicle recognizes a corresponding signal (a driver also makes a decision by comprehensively considering information regarding road markings and signs, movement of preceding vehicles, navigation guidance, past experience, etc.).

FIGS. 3A and 3B show examples in which it is still difficult to find a travelable direction even when signal information is received. In detail, FIG. 3A shows an example in which it is still difficult to determine on which road travel is allowed depending on shape of a road even when a left turn signal is turned on, and FIG. 3B shows an example in which it is still difficult to determine on which road travel is allowed even when a straight signal is turned on.

Accordingly, the present invention is intended to solve the above problems. According to an embodiment of the present invention, autonomous driving is performed using a map including information regarding traffic lights and road structures that are linked to one another, a camera, and a V2X communication device.

Figure 4:
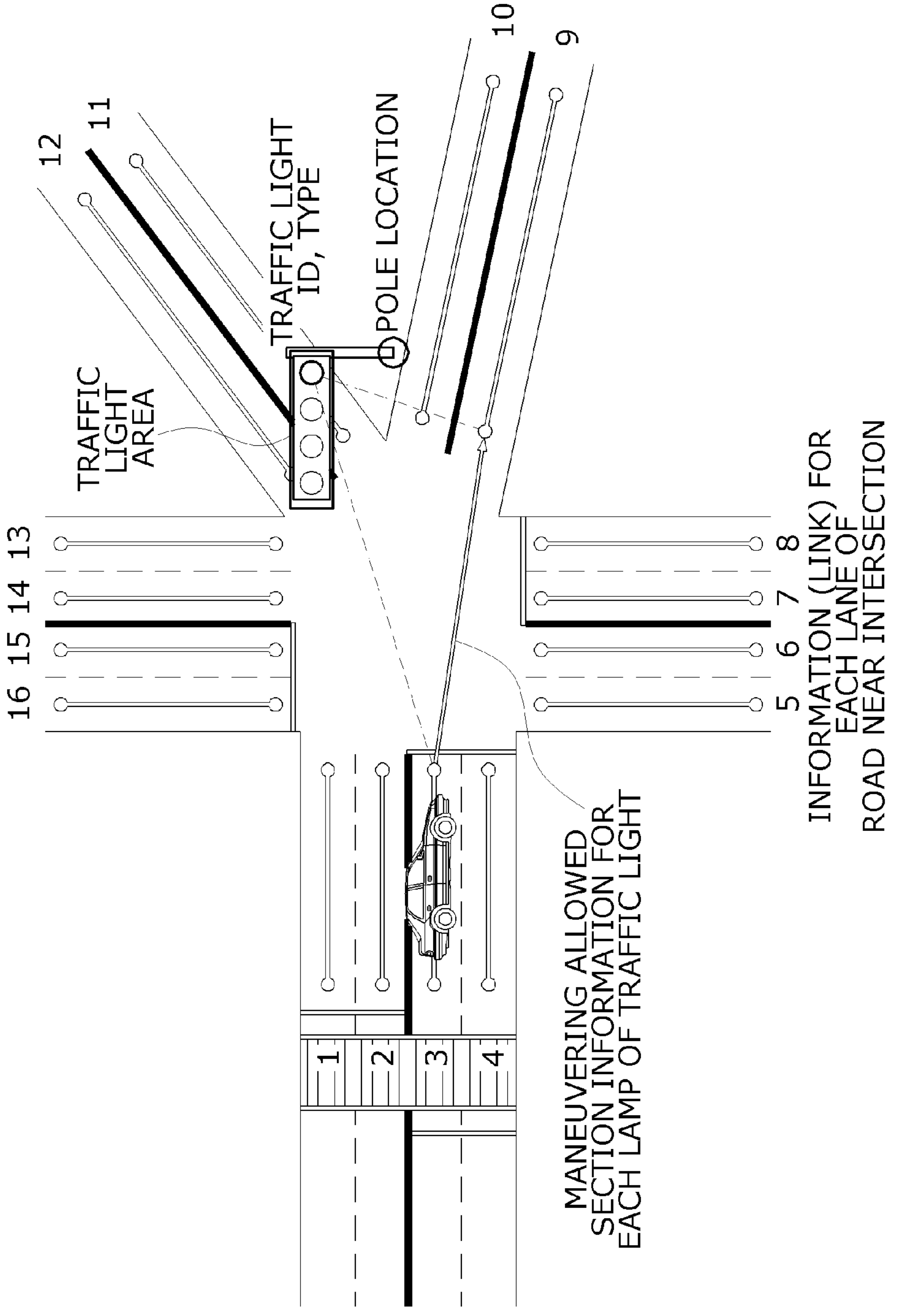
FIG. 4 is a diagram showing lane-specific default map elements of a traffic light and a nearby road according to an embodiment of the present invention.

FIG. 4 is a diagram showing lane-specific default map elements of a traffic light and a nearby road according to an embodiment of the present invention. As shown in FIG. 4, a map has a structure in which a traffic light and a road structure are linked.

The map includes lane-specific information (link) of a nearby road such as intersections and crosswalks. Also, the map includes three-dimensional (3D) geometric information indicating an ID, a type (vertical type, horizontal type, three-lamp type, or four-lamp type), a pole position, and an actual signal area.

Also, a signal type (red, yellow, green, left-turn, straight, right-turn, direction of 11 o'clock, direction of 1 o'clock, etc.) and maneuvering allowed section information (entry link information and exit link information of a road) for each lamp (the first lamp, the second lamp, the third lamp, etc.) of a traffic light are established in the map. For example, with reference to FIG. 4, for the maneuvering allowed section information for each lamp of a traffic light, a green signal has maneuvering allowed section information indicating allowed entrance to the third link and exiting from the ninth link.

Map information shown in FIG. 4 may be built in and used by the autonomous driving vehicle and also a traffic light infrastructure server. However, the autonomous driving vehicle and the traffic light infrastructure server may have different map types and also different number systems. Accordingly, the two maps may need to be mapped when used.

As shown in FIG. 4, an autonomous driving device installed in the vehicle uses the camera at intersections or crosswalks at which V2X communication devices are not installed. In this case, the autonomous driving vehicle finds a location of a traffic light corresponding to a lane on which the autonomous driving vehicle is traveling by using the map, converts recognized signal information into lane-specific maneuvering allowed section information in the map, and determines whether to travel.

Accordingly, the traffic light recognition problem caused by the stop location as shown in FIG. 2 may be solved by stopping the autonomous driving vehicle at a location at which the traffic light may be recognized using traffic light location information included in the map.

Also, which lane is allowed according to a corresponding signal in FIGS. 3A and 3B may be determined using the map.

Also, at large intersections, traffic light signal information and map information may be transmitted to nearby vehicles by using a V2X device. In this case, the problem described with reference to FIG. 1 may be solved according to communication coverage. When traffic light signal information and traffic light signal recognition information are received through V2X communication and by a camera, respectively, at the same time, the traffic light signal information received through V2X communication is used because the traffic light signal information has high reliability.

Figure 5:
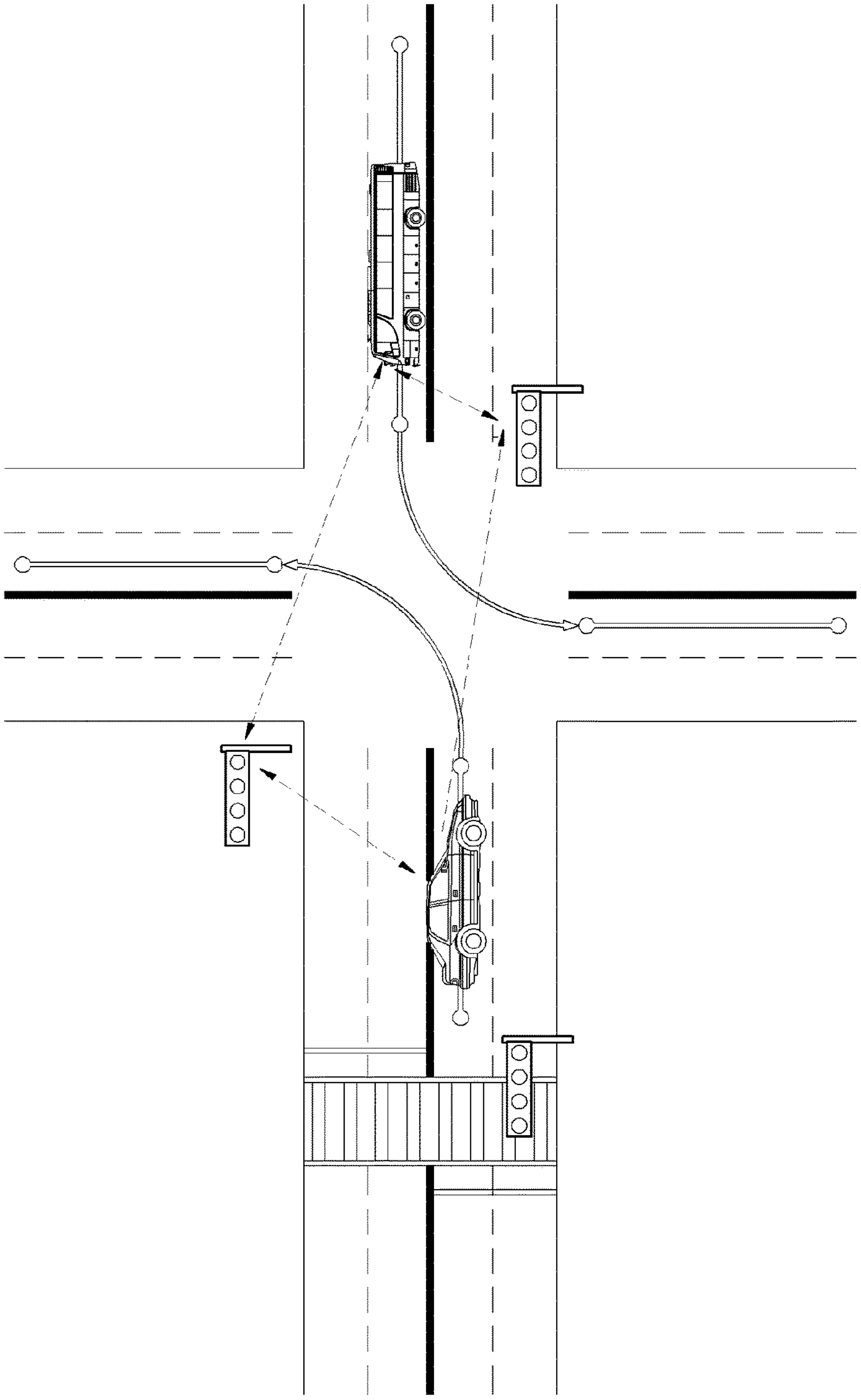
FIG. 5 is a diagram for describing a process in which an autonomous driving vehicle sends intersection passage route information to an intersection traffic light infrastructure server when the autonomous driving vehicle is traveling autonomously at an intersection.

Here, a method of increasing traffic efficiency when only autonomous driving vehicles provided with the components (i.e., the map, the camera, and V2X device) are at an intersection will be described with reference to FIG. 5. FIG. 5 is a diagram for describing a process in which an autonomous driving vehicle sends intersection passage route information to an intersection traffic light infrastructure server when the autonomous driving vehicle is autonomously traveling at an intersection.

As shown in FIG. 5, the traffic light infrastructure server transmits traffic light signal information and intersection map information using a V2X communication device and recognizes vehicles near the intersection through a camera. When all of the vehicles recognized at the intersection send intersection passage route information to a traffic light infrastructure server, the traffic light infrastructure server may control a traffic light to allow travel of the vehicles at the same time, thus increasing traffic efficiency.

Meanwhile, in the intersection passage route information, intersection information of a global route planning result of the autonomous driving system is converted into a format of common map information transmitted from the intersection and then transmitted. That is, the autonomous driving device in the vehicle transmits the intersection passage route information in a format (such as an entrance lane link ID or an exit lane link ID) using the map information transmitted by the infrastructure server. As shown in FIG. 5, when the traffic light infrastructure server transmits intersection passage information of other vehicles to a plurality of vehicles equipped with autonomous driving devices at the intersection, the autonomous driving devices of the vehicles may safely recognize and determine other vehicles even when the vehicles are parked.

Hereinafter, an autonomous vehicle driving system and method according to an example embodiment of the present invention will be described in detail with reference to the accompanying drawings.

First, the autonomous vehicle driving system according to an embodiment of the present invention may include, although not shown, an autonomous driving device 200 installed in a vehicle and a traffic light infrastructure server 100 installed at an intersection or a crosswalk at which a light traffic is located.

Figure 6:
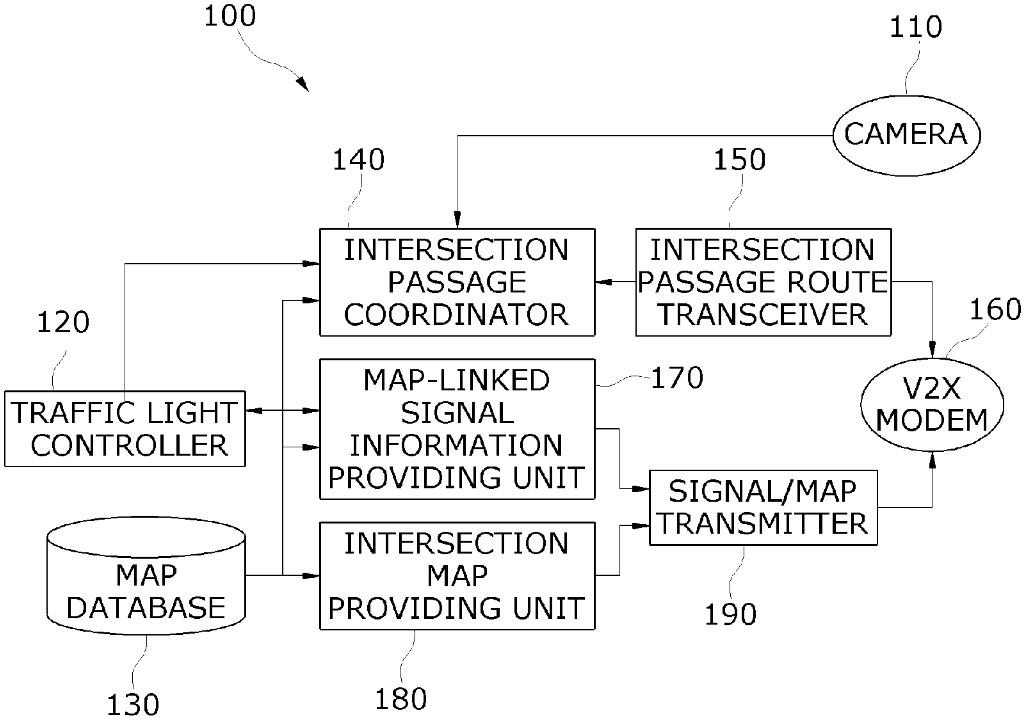
FIG. 6 is a block diagram showing a traffic light infrastructure server, which is one component of an autonomous driving system of a vehicle according to an embodiment of the present invention.

FIG. 6 is a detailed block diagram showing a traffic light infrastructure server 100 that communicates with an autonomous driving device 200 in an autonomous vehicle driving system according to an embodiment of the present invention.

As shown in FIG. 6, the traffic light infrastructure server 100 may include a camera 110, a traffic light controller 120, a map database 130, an intersection passage coordinator 140, an intersection passage route transceiver 150, a V2X modem 160, a map-linked signal information providing unit 170, an intersection map providing unit 180, and a signal/map transmitter 190.

The camera captures an image of a vehicle traveling near an intersection or a crosswalk where a traffic light is located and provides the captured image to the intersection passage coordinator 140.

The traffic light controller 120 is responsible for changing a signal of the traffic light at the intersection or crosswalk and provides traffic light change information to the intersection passage coordinator 140 and the map-linked signal information providing unit 170.

The map-linked signal information providing unit 170 creates lamp-specific signal information and maneuvering allowed section information using the traffic light change information provided by the traffic light controller 120 and nearby road map information stored in the map database 130 and provides the created information to the signal/map transmitter 190.

The intersection map providing unit 180 provides information associated with the traffic light and an intersection road network structure described with reference to FIG. 4 to the signal/map transmitter 190 using the map database 130.

The signal/map transmitter 190 broadcasts the lamp-specific signal information and maneuvering allowed section information provided by the map-linked signal information providing unit 170 and the information associated with the traffic light and an intersection road network structure provided by the intersection map providing unit 180 to a vehicle located near the intersection and equipped with an autonomous driving device, by using the V2X modem 160.

The intersection passage route transceiver 150 receives intersection passage route information transmitted from the vehicles that are located in the vicinity of the intersection and equipped with autonomous driving devices through the V2X modem 160 and transmits (or share) the received information to the autonomous driving device of the nearby vehicle through the V2X modem 160.

The intersection passage coordinator 140 compares the number of vehicles in the image captured by the camera 110 with the number of pieces of the intersection passage route information received through the V2X model 160 by the intersection passage route transceiver 150.

When a result of the comparison is that the numbers are equal to each other, the intersection passage coordinator 140 determines whether routes of vehicles passing through the intersection will lead to collisions with each other and provides a control signal to the traffic light controller 120 and performs signal change control of the traffic light when the routes of the vehicle passing through the intersection will not lead to collisions.

A configuration and operation of the autonomous driving device installed in the vehicle according to an embodiment of the present invention will be described with reference to FIG. 7.

Figure 7:
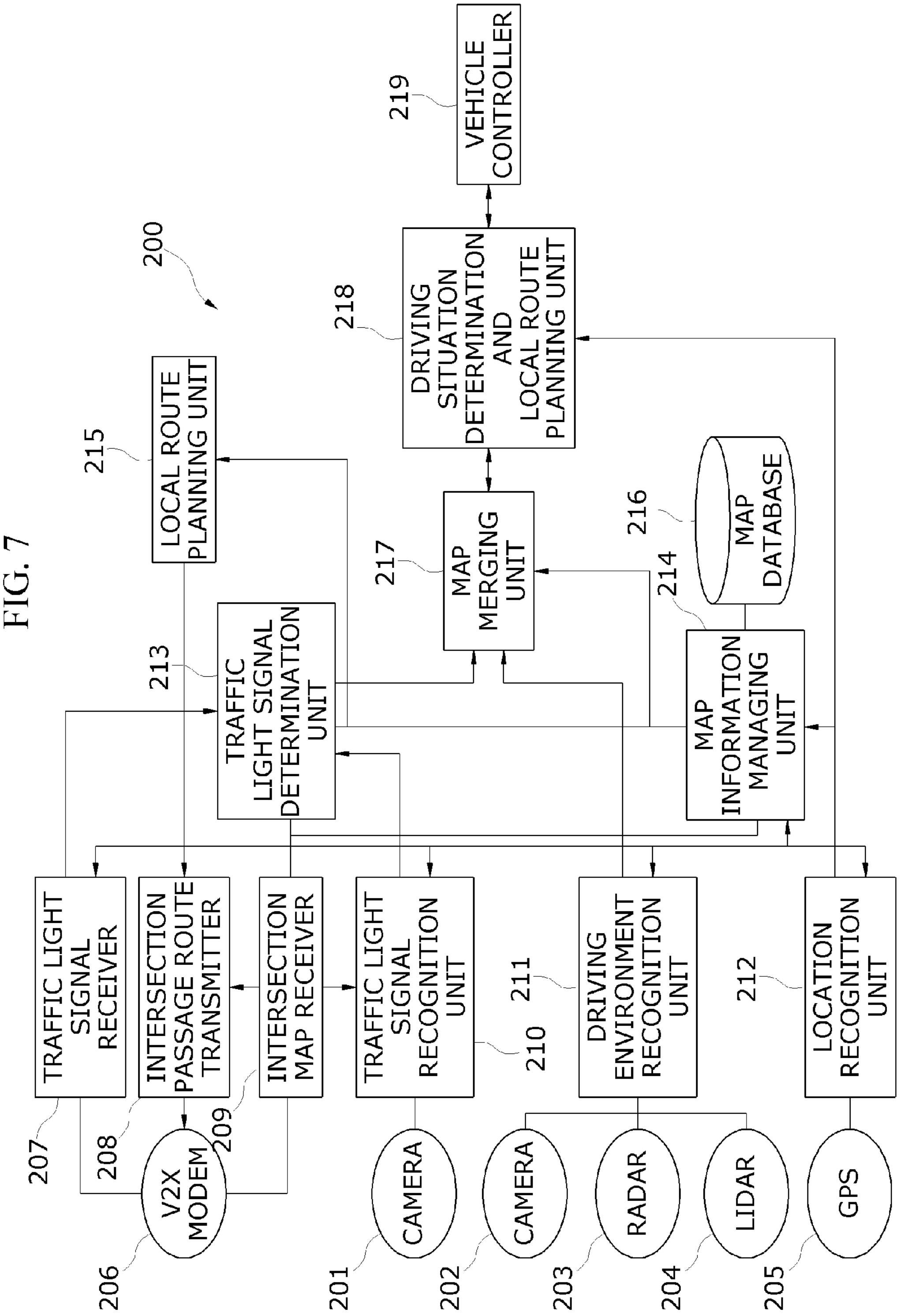
FIG. 7 is a block diagram showing an autonomous driving device installed in a vehicle, which is one component in an autonomous vehicle driving system according to an embodiment of the present invention.

FIG. 7 is a detailed block diagram showing an autonomous driving device installed in a vehicle in an autonomous vehicle driving system according to an embodiment of the present invention.

As shown in FIG. 7, an autonomous driving device 200 installed in each vehicle may include a plurality of cameras 201 and 202, a radar device 203, a LiDAR device 204, a GPS device 205, a V2X modem 206, traffic light signal receiver 207, an intersection passage route transmitter 208, an intersection map receiver 209, a traffic light signal recognition unit 210, a driving environment recognition unit 211, a location recognition unit 212, a traffic light signal determination unit 213, a map information managing unit 214, a global route planning unit 215, a map database 216, a map merging unit 217, a driving situation determination and local route planning unit 218, and a vehicle controller 219.

The location recognition unit 212 acquires global location information using map information regarding a location of a host vehicle obtained through the GPS device 205 and a current location provided by the map information managing unit 214 and provides the acquired global location information to the driving situation determination and local route planning unit 218. Here, the map information may be prestored in the map database 216.

The driving environment recognition unit 211 recognizes an obstacle and a travelable area using the camera 202, the radar device 203, and the LiDAR device 204 installed in the vehicle and provides obstacle information and travelable area information to the map merging unit 217.

The traffic light signal recognition unit 210 receives the map information provided by the map information managing unit 214 and information regarding a map of surroundings of the traffic light that is received from the traffic light infrastructure server 100 to the intersection map receiver 209 through the V2X modem 206, finds a location of the traffic light, recognizes a corresponding signal of the location using the camera 201 installed in the vehicle, and provides maneuvering allowed section information to the traffic light signal determination unit 213.

The traffic light signal receiver 207 receives traffic light state information of a traffic light near a crosswalk or intersection through the V2X modem 206 from a traffic light infrastructure server 100 of the traffic light near the crosswalk or intersection and provides the received information to the traffic light signal determination unit 213.

The traffic light signal determination unit 213 determines a current signal state of the traffic light using the traffic light state information provided from the traffic light signal receiver 207 and traffic light recognition information provided from the traffic light signal recognition unit 210. When both of the traffic light state information and the traffic light recognition information are received from the traffic light signal receiver 207 and the traffic light signal recognition unit 210, the traffic light signal determination unit 213 uses the traffic light state information provided from the traffic light signal receiver 207 to determine the traffic light state because the traffic light state information transmitted from the traffic light infrastructure server 100 through the V2X modem 206 has high accuracy. However, when the traffic light state information is not provided from the traffic light signal receiver 207 but the traffic light recognition information is provided from the traffic light signal recognition unit 210, the traffic light signal determination unit 213 determines the final traffic light state using only the traffic light recognition information provided from the traffic light signal recognition unit 210.

The global route planning unit 215 calculates a global route from an origin to a destination that is set by a user by using the map information provided from the map information managing unit 214 and provides information regarding the calculated global route to the intersection passage route transmitter 208.

The intersection passage route transmitter 208 converts the global route information provided from the global route planning unit 215 into a common map type provided from the intersection map receiver 209 and transmits the global route information having the common map type to the traffic light infrastructure server 100 through the V2X modem 206.

The map information managing unit 214 selectively provides traffic-light-associated map information and road network information stored in the map database 216, map information and built-in map mapping information provided from the intersection map receiver 209, and other map layers needed for autonomous driving to the location recognition unit 212, the driving environment recognition unit 211, and the global route planning unit 215.

The map merging unit 217 merges dynamic information such as driving environment recognition information provided from the driving environment recognition unit 211 and maneuvering allowed section information provided from the traffic light signal determination unit 213 with static map information provided from the map information managing unit 214 and provides the merged map information to the driving situation determination and local route planning unit 218.

The driving situation determination and local route planning unit 218 determines safe driving behavior (e.g., left/right turn, U-turn, lane change, or speed control) needed for the autonomous driving vehicle to track the global route in a current road driving situation, plans a local route for the driving behavior, and provides a command signal for vehicle control to the vehicle controller 219.

The vehicle controller 219 controls an actuator for tracking route information provided from the driving situation determination and local route planning unit 218 to control the driving of the vehicle.

Operation of the autonomous driving device 200 installed in a vehicle and operation of the traffic light infrastructure server 100 installed near an intersection or crosswalk where a traffic light is located will be sequentially described with reference to FIGS. 8 and 9.

Figure 8A:
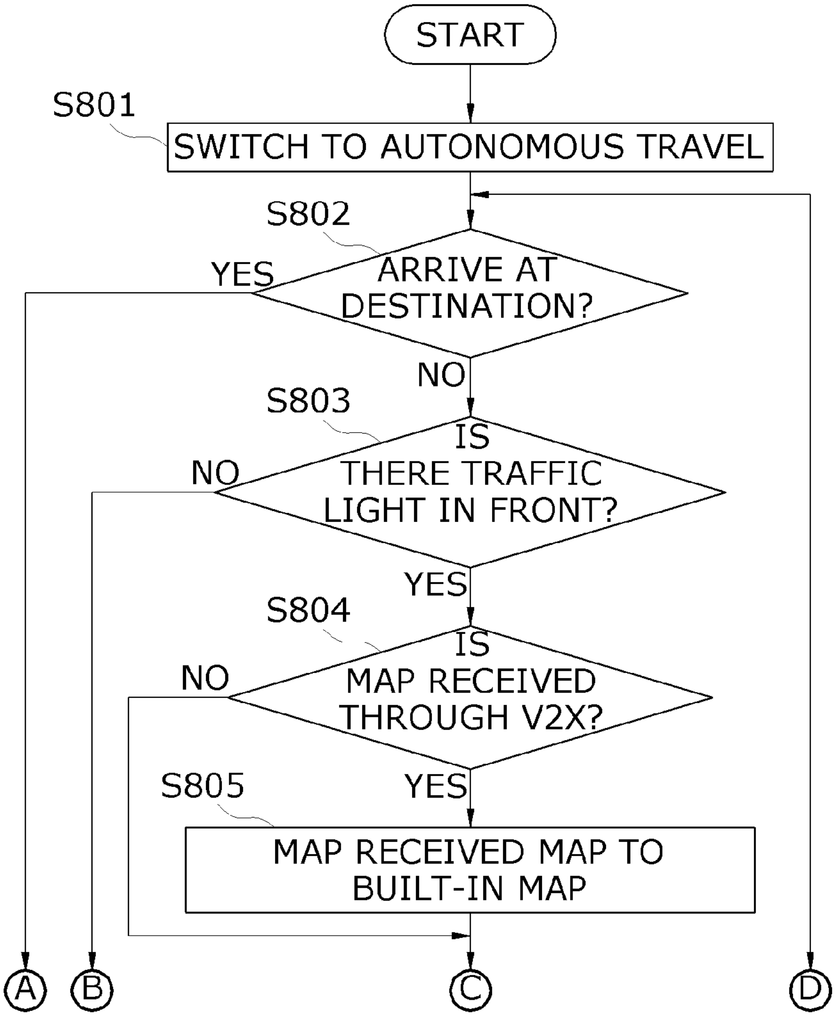
FIG. 8A and FIG. 8B is an operational flowchart showing an autonomous driving method of an autonomous driving device installed in a vehicle, which is one process in an autonomous vehicle driving method according to an embodiment of the present invention.
Figure 8B:
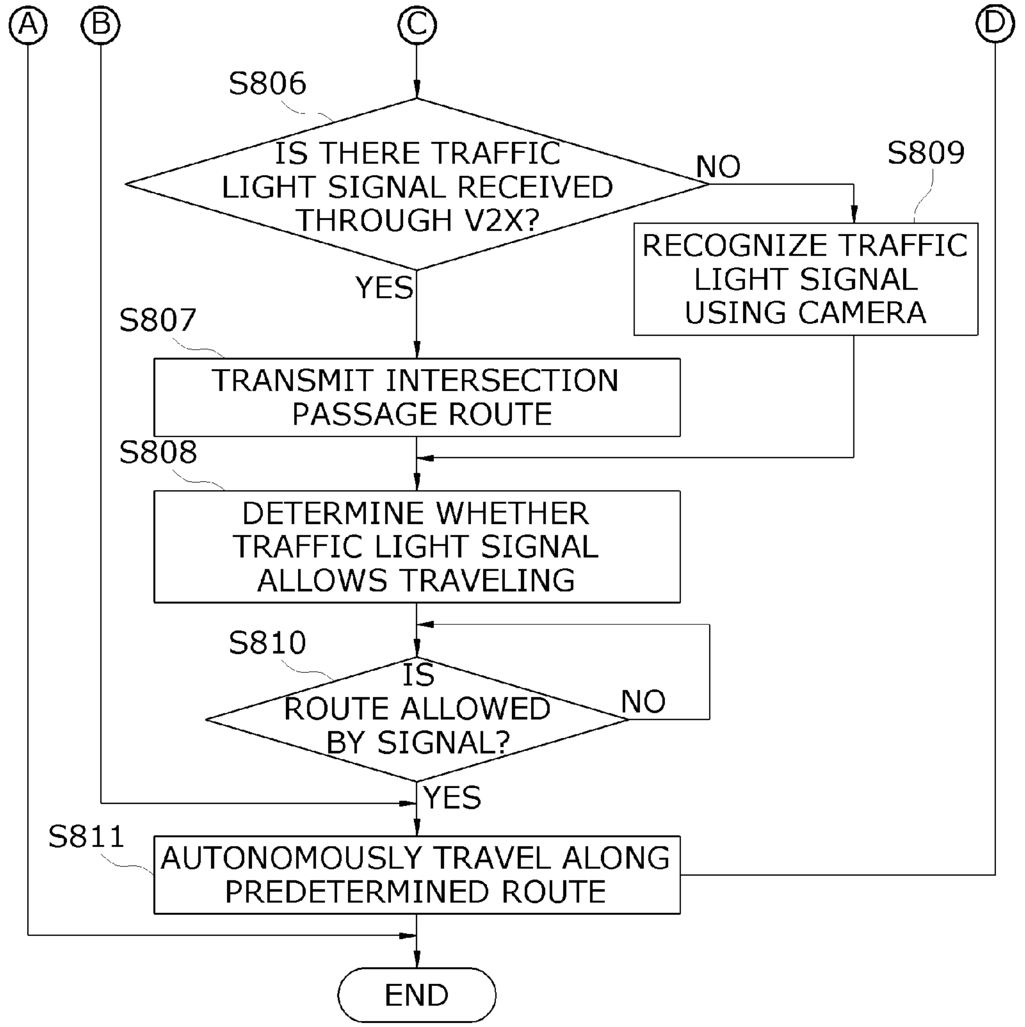

First, the operation of the autonomous driving device 200 installed in a vehicle will be described with reference to FIG. 8A and FIG. 8B. FIG. 8A and FIG. 8B is an operational flowchart showing an autonomous driving process of the autonomous driving device installed in a vehicle in an autonomous vehicle driving method according to an embodiment of the present invention.

As shown in FIG. 8A and FIG. 8B, first, a driver switches the driving mode of a vehicle to an autonomous driving mode as necessary while driving the vehicle (S801).

When the driving mode of the vehicle is switched to the autonomous driving mode, the autonomous driving device 200 determines whether the vehicle has arrived at a destination set by the driver (S802).

When it is determined that the vehicle has not arrived at the destination, the autonomous driving device 200 determines whether there is a traffic light in front of the vehicle (S803).

When it is determined that no traffic light is in front of the vehicle, the vehicle autonomously travels along a predetermined route (S811).

However, when it is determined in step S803 that there is a traffic light in front of the vehicle, the autonomous driving device 200 determines whether a map of surroundings of the intersection or crosswalk where the traffic light is located is received from the traffic light infrastructure server 100 through V2X communication (S804).

When it is determined that a map of surroundings of the intersection or crosswalk where the traffic light is located is not received from the traffic light infrastructure server 100 through V2X communication, the autonomous driving device 200 determines whether a traffic light signal is received from the traffic light infrastructure server 100 through V2X communication (S806).

However, when it is determined in step S804 that a map of surroundings of the intersection or crosswalk where the traffic light is located is received, the autonomous driving device 200 maps the received map onto a built-in map (S805).

After the mapping, the autonomous driving device 200 determines whether a traffic light signal is received from the traffic light infrastructure server 100 through V2X communication.

When it is determined that the traffic light signal is not received from the traffic light infrastructure server 100 through V2X communication, the autonomous driving device 200 recognizes a signal of a traffic light in front of the vehicle through a camera installed in the vehicle (S809).

However, when it is determined in step S806 that the traffic light signal is received from the traffic light infrastructure server 100 through V2X communication, the autonomous driving device 200 transmits intersection passage route information to the traffic light infrastructure server 100 through V2X communication (S807).

Subsequently, the autonomous driving device 200 determines whether the traffic light signal allows the vehicle to travel in an intended direction (S808, S810). Here, the determination of whether the traffic light signal allows the vehicle to travel in an intended direction may be made using the traffic light signal transmitted from the traffic light infrastructure server 100 in step S806 or a traffic light recognition signal obtained through the camera in step S809.

When it is determined that the traffic light signal does not allow the vehicle to travel in an intended direction, the autonomous driving device 200 controls the vehicle to be stopped until the traffic light signal allows the vehicle to travel and repeatedly determines whether the traffic light signal is switched to allow the travel of the vehicle.

However, when it is determined in step S810 that the traffic light signal allows the vehicle to travel in an intended direction, the vehicle autonomously travels along a predetermined route, that is a set route (S811).

The operation of the traffic light infrastructure server 100 installed near the intersection or crosswalk where the traffic light is located will be described with reference to FIG. 9. FIG. 9 is a flowchart showing operational flow of a traffic light infrastructure server in an autonomous vehicle driving method according to an embodiment of the present invention.

Figure 9:
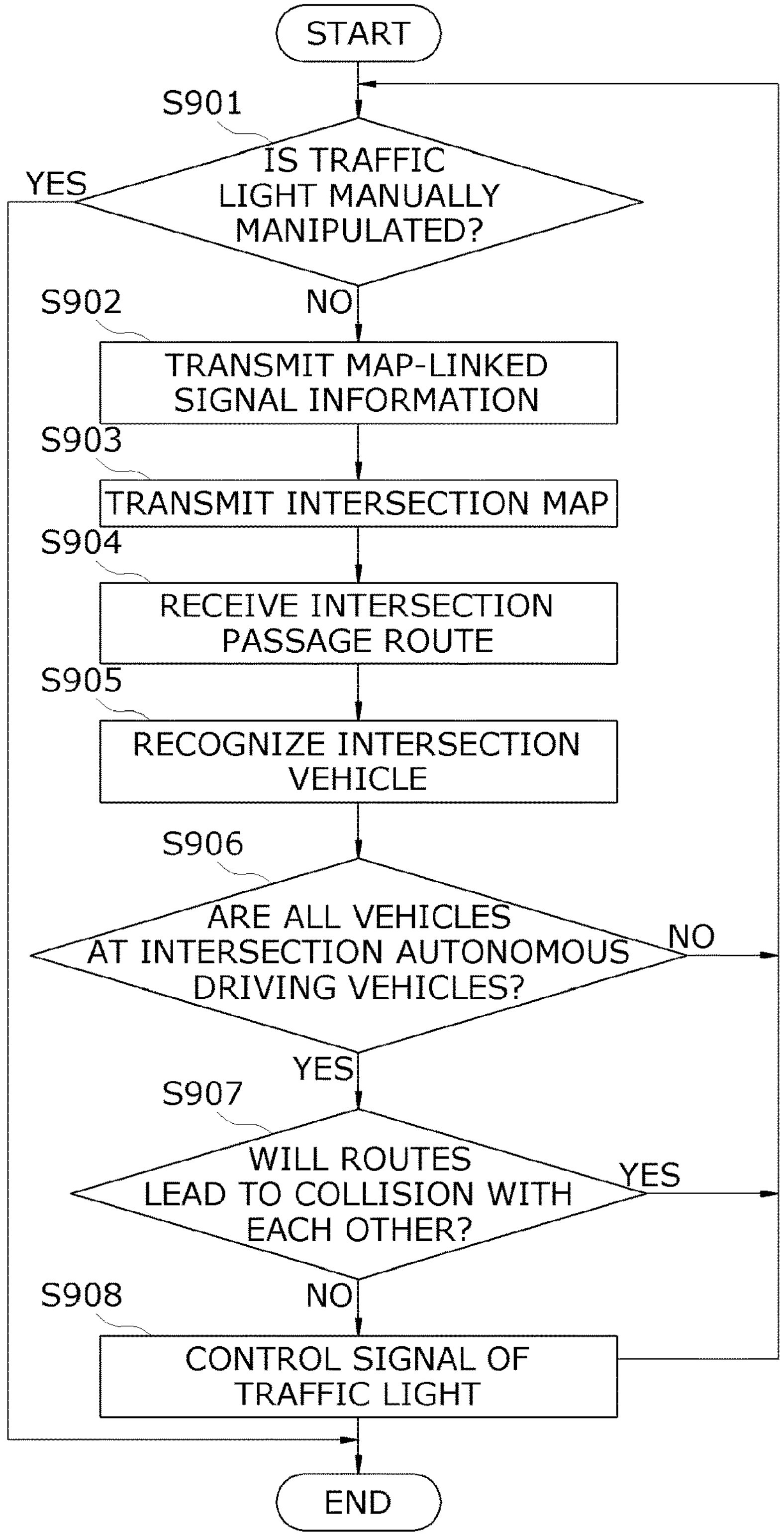
FIG. 9 is a flowchart showing operational flow of a traffic light infrastructure server in an autonomous vehicle driving method according to an embodiment of the present invention.

As shown in FIG. 9, first, the traffic light infrastructure server 100 determines whether a traffic light at an intersection or crosswalk is manually controlled (S901).

When it is determined that the traffic light is manually controlled, the traffic light infrastructure server 100 stops operating. When it is determined that the traffic light is not manually controlled, that is the traffic light is automatically controlled, the traffic light infrastructure server 100 transmits information regarding map-linked signals and information regarding a map of surroundings of the intersection to autonomous driving devices 200 of a vehicle traveling near the intersection through a V2X modem (S902, S903).

The traffic light infrastructure server 100 receives information regarding intersection passage routes from the autonomous driving devices 200 of the vehicles traveling near the intersection through V2X communication (S904).

Subsequently, the traffic light infrastructure server 100 recognizes vehicles near the intersection (S905) and determines whether the number of recognized vehicles is equal to the number of intersection passage routes, that is, whether all of the vehicles at the intersection are autonomous driving vehicles (S906).

When not all of the vehicles at the intersection are autonomous driving vehicles, the traffic light infrastructure server 100 repeatedly performs the above operation. When all of the vehicles at the intersection are autonomous driving vehicles analyzes information regarding intersection passage routes received from the autonomous driving devices 200 of the vehicles and determines whether the autonomous driving vehicles are likely to collide with each other (S907).

When it is determined that the autonomous driving vehicles are not likely to collide each other, the traffic light infrastructure server 100 controls the signal of the traffic light at the intersection so that collisions between the autonomous driving vehicles do not occur (S908).

According to an embodiment of the present invention, it is possible to increase probability that a signal state of a traffic light will be recognized and determine from which entrance lane to which exit lane travel is allowed according to the signal state of the traffic light when a vehicle is autonomously traveling at an intersection or crosswalk where the traffic light is located. It is also possible to exchange intersection passage route information between a traffic light infrastructure and autonomous driving vehicles, thus making an efficient traffic flow and to predict travel directions of nearby autonomous driving vehicles, thus helping to recognize and determine the nearby autonomous driving vehicles.

An autonomous vehicle driving system and method of the present invention have been described according to example embodiments. However, the present invention is not limited to the particular embodiments. It is obvious to those skilled in the art that there are many various modifications and variations without departing from the spirit or the technical scope of the appended claims.

Accordingly, the embodiments of the present invention are to be considered descriptive and not restrictive of the present invention, and do not limit the scope of the present invention. The scope of the present invention should be determined by the following claims and their appropriate legal equivalents.

What is claimed is:

1. An autonomous vehicle driving system comprising:

an autonomous driving device installed in a vehicle and configured, when there is a traffic light in front while the vehicle is driving autonomously, to receive traffic light signal information and map information regarding a travel location over a network, map the received map information to prestored map information, and perform autonomous driving along a predetermined route when the received traffic light signal information corresponding to its own travel route information is a traveling allowed signal; and a server configured to transmit the map information regarding the travel location and the traffic light signal information to the autonomous driving device over the network, receive information regarding a passage route at an intersection or a crosswalk where the traffic light is located from the autonomous driving device, analyze possibility of autonomous driving vehicles colliding according to the received passage route information, and control a signal of the traffic light at the intersection or crosswalk according to a result of the analysis.

2. The autonomous vehicle driving system of claim 1, wherein when the traffic light signal information is not received from the server, the autonomous driving device determines whether the signal of the traffic light is a traveling allowed signal by using a camera installed in the vehicle.

3. The autonomous vehicle driving system of claim 1, wherein the autonomous driving device and the server transmit or receive data through vehicle-to-everything (V2X) communication.

4. The autonomous vehicle driving system of claim 1, wherein the server receives information regarding travel routes from autonomous driving devices installed in a plurality of autonomous driving vehicles, recognizes vehicles near the intersection or crosswalk where the traffic light is located according to the received travel route information of the autonomous driving devices, compares the number of travel routes with the number of recognized vehicles, and determines whether all of the vehicles traveling at the crosswalk or intersection are autonomous driving vehicles.

5. The autonomous vehicle driving system of claim 4, wherein when all of the vehicles traveling at the crosswalk or intersection are autonomous driving vehicles, the server determines whether the travel routes of the autonomous driving vehicles will lead to collisions with each other and controls the signal of the traffic light according to a result of the determination.

6. The autonomous vehicle driving system of claim 1, wherein the autonomous driving device comprises:

a driving environment recognition unit configured to recognize an obstacle and a travelable area of the route while the vehicle is traveling autonomously and create obstacle recognition information and travelable area information;

a traffic light signal recognition unit configured to recognize a signal state of the traffic light from a forward-direction image of the travel route;

a receiver configured to receive traffic light signal information of the intersection or crosswalk where the traffic light is located and information regarding a map of surroundings of the intersection or crosswalk from the server through V2X communication;

a transmitter configured to transmit the travel route information to the server through V2X communication according to the map information corresponding to its own location information;

a traffic light signal determination unit configured to determine a current state of the traffic light according to the traffic light signal information received through the receiver or the traffic light signal state information recognized by the traffic light signal recognition unit;

a map merging unit configured to merge the map information, driving environment information, and the information regarding a map of surroundings of the intersection or crosswalk received from the server through the receiver to create a map of the travel route; and a driving situation determination and route planning unit configured to determine a driving situation according to the map mapped by the map merging unit, the location information, and the traffic light signal state determined by the traffic light signal determination unit, plan a local route according to the driving situation, and generate a control signal for controlling autonomous driving of the vehicle.

7. The autonomous vehicle driving system of claim 6, wherein the autonomous driving device further comprises:

a global route planning unit configured to calculate a global route from an origin to a destination that is set by a user using the map information and provide information regarding the calculated global route to the transmitter;

a location recognition unit configured to acquire global location information using the map information and a location of the vehicle obtained through GPS and provide the acquired global location information to the driving situation determination and route planning unit; and a driving environment recognition unit configured to recognize the obstacle and the travelable area on the travel route and provide the driving environment information including obstacle recognition information and travelable area information to the map merging unit.

8. The autonomous vehicle driving system of claim 7, wherein the driving environment information including the obstacle recognition information and the travelable area information is recognized using information obtained with a camera, a radar, and a LiDAR installed in the vehicle.

9. The autonomous vehicle driving system of claim 1, wherein the server comprises:

an image acquisition unit configured to acquire an image of vehicles traveling near the intersection or crosswalk where the traffic light is located;

a traffic light controller configured to control a signal state of the traffic light of the intersection or crosswalk according to a provided control signal and create signal state information of the traffic light;

an intersection passage route transceiver configured to receive intersection passage route information from the autonomous driving device through V2X communication and transmit the received intersection passage route information to an autonomous driving device of a nearby vehicle through V2X communication;

a map-linked signal information providing unit configured to create lamp-specific signal information and maneuvering allowed section information using the traffic light signal state information and nearby-road map information created by the traffic light controller;

an intersection map providing unit configured to broadcast the traffic light signal state information and an intersection road network structure to autonomous driving devices through V2X communication using the nearby-road map information; and an intersection passage coordinator configured to analyze the number of vehicles traveling near the intersection using the acquired image, analyze possibility of collision between the autonomous driving vehicles using the intersection passage route information received through the intersection passage route transceiver, and provide a control signal for controlling the signal of the traffic light at the intersection or crosswalk to the traffic light controller according to a result of the analysis.

10. The autonomous vehicle driving system of claim 9, wherein the intersection passage coordinator determines whether all of the vehicles passing through the intersection are autonomous driving vehicles by using the number of vehicles traveling near the intersection obtained through the acquired image and the number of pieces of the intersection passage route information received through the intersection passage route transceiver, determines whether the autonomous driving vehicles will collide with each other at the intersection when it is determined that all of the vehicles are autonomous driving vehicles, and provides the control signal to the traffic light controller according to a result of the determination.

11. The autonomous vehicle driving system of claim 10, wherein the intersection passage coordinator determines that all of the vehicles passing through the intersection are autonomous driving vehicles when the number of vehicles traveling near the intersection is equal to the number of pieces of the intersection passage route information received through the intersection passage route transceiver and controls the control signal to the traffic light controller when the routes of the vehicles passing through the intersection will not lead to collisions with each other.

12. An autonomous vehicle driving method comprising:

by an autonomous driving device installed in a vehicle, receiving traffic light signal information and map information regarding a travel location over a network when there is a traffic light in front while the vehicle is traveling autonomously, mapping the received map information to prestored map information, and performing autonomous driving along a predetermined route when the received traffic light signal information, which corresponds to its own travel route information, is a traveling allowed signal; and by a server, transmitting the map information regarding the travel location and the traffic light signal information to the autonomous driving device over the network, receiving information regarding a passage route at an intersection or a crosswalk where the traffic light is located from the autonomous driving device, analyzing possibility of collision between autonomous driving vehicles according to the received passage route information, and controlling a signal of the traffic light at the intersection or crosswalk according to a result of the analysis.

13. The autonomous vehicle driving method of claim 12, wherein the autonomous driving device and the server transmit or receive data through V2X communication.

14. The autonomous vehicle driving method of claim 12, wherein the performing of autonomous driving comprises:

mapping a map of surroundings of the intersection or crosswalk where the traffic light is located that is received from the server through V2X communication with a map of a planned route when there is a traffic light in front of the vehicle while the vehicle travels in an autonomous driving mode;

transmitting intersection passage route information to the server through V2X communication when traffic light signal state information is received from the server through V2X communication; and performing autonomous driving along a predetermined route when the received traffic light state information is a signal for allowing the vehicle to travel in an intended direction.

15. The autonomous vehicle driving method of claim 14, wherein the performing of autonomous driving comprises, when the traffic light signal state information is not received from the server through V2X communication, recognizing a signal state of the traffic light in front of the vehicle through a camera installed in the vehicle and determining whether to allow the travel.

16. The autonomous vehicle driving method of claim 12, wherein the controlling of a signal of the traffic light comprises:

broadcasting the map-linked signal information and the map information regarding the surroundings of the intersection to an autonomous driving device of a vehicle traveling near the intersection through a V2X modem when signal manipulation mode of the traffic light at the intersection or crosswalk is an automatic manipulation mode;

receiving information regarding intersection passage routes from autonomous driving devices of vehicles near the intersection through V2X communication;

recognizing the vehicles traveling near the intersection; and analyzing whether the routes of the recognized autonomous driving vehicles will lead to collisions with each other and controlling signal state of the traffic light at the intersection according to a result of the analysis.

17. The autonomous vehicle driving method of claim 16, wherein the traveling vehicles are recognized using an image acquired through a camera.

18. The autonomous vehicle driving method of claim 16, wherein the controlling of a signal state of the traffic light comprises:

comparing the number of recognized traveling vehicles and the number of pieces of the intersection passage route information received through V2X communication;

determining that all of the traveling vehicles are autonomous driving vehicles, analyzing the intersection passage route information received from the autonomous driving devices of the vehicles, and determining whether the autonomous driving vehicles are likely to collide with each other when the number of traveling vehicles is equal to the number of pieces of the received intersection passage route information; and controlling the signal of the traffic light at the intersection when it is determined that the autonomous driving vehicles are not likely to collide with each other.

* * * * *